United States Patent
Perrine et al.

(10) Patent No.: US 10,089,401 B2
(45) Date of Patent: Oct. 2, 2018

(54) METHOD AND PLUGGABLE SYSTEM FOR TREND-BASED ALLOCATION OF MEDIA ASSETS BETWEEN GLOBAL AND LOCAL STORAGE

(71) Applicant: Fox Broadcasting Company, Los Angeles, CA (US)

(72) Inventors: Dean Perrine, Los Angeles, CA (US); Christopher D. Blandy, Santa Monica, CA (US); Joseph P. Coffaro, Thousand Oaks, CA (US)

(73) Assignee: FOX BROADCASTING COMPANY, Los Angeles, CA (US)

( * ) Notice: Subject to any disclaimer, the term of this patent is extended or adjusted under 35 U.S.C. 154(b) by 0 days.

(21) Appl. No.: 15/042,066

(22) Filed: Feb. 11, 2016

(65) Prior Publication Data
US 2017/0199886 A1    Jul. 13, 2017

Related U.S. Application Data

(60) Provisional application No. 62/277,852, filed on Jan. 12, 2016.

(51) Int. Cl.
G06F 17/30 (2006.01)

(52) U.S. Cl.
CPC .... *G06F 17/3087* (2013.01); *G06F 17/30312* (2013.01); *G06F 17/30867* (2013.01)

(58) Field of Classification Search
USPC .................................................. 707/705, 741
See application file for complete search history.

(56) References Cited

U.S. PATENT DOCUMENTS

| | | | | |
|---|---|---|---|---|
| 8,229,897 B2* | 7/2012 | Cannon | ................ | G06F 11/1451 707/644 |
| 8,463,990 B2* | 6/2013 | Arakawa | ................ | G06F 3/0605 711/114 |
| 8,473,643 B2* | 6/2013 | Otani | .................. | H04L 67/1097 710/40 |
| 8,775,431 B2* | 7/2014 | Jason | .................. | G06F 17/3061 707/708 |
| 9,319,372 B2* | 4/2016 | Deurloo | .................. | H04L 51/32 |
| 9,326,296 B2* | 4/2016 | Basra | ................ | H04W 72/1242 |
| 9,331,345 B2* | 5/2016 | Yamamoto | .......... | H01M 8/0276 |
| 9,606,736 B2* | 3/2017 | Iliadis | .................... | G06F 3/0611 |
| 9,812,128 B2* | 11/2017 | Mixter | .................... | G10L 15/22 |

OTHER PUBLICATIONS

International Search Report and Written Opinion dated Mar. 13, 2017 for PCT Application No. PCT/US2017/013270 filed on Jan. 12, 2017.

* cited by examiner

*Primary Examiner* — Kim Nguyen
(74) *Attorney, Agent, or Firm* — Gates & Cooper LLP

(57) ABSTRACT

A method, apparatus, article of manufacture, and a memory structure for allocating storage of media programs among global and local storage assets for hot and cold storage is disclosed. Trend data is obtained from a plurality of sources including web page click-throughs and social media, indexed and combined with data describing available media programs to identify media programs of interest and reallocate them to hot storage as required. The system uses REST-compliant methods and commands and is therefore pluggable and can be used with a variety of existing systems.

20 Claims, 6 Drawing Sheets

METHOD AND PLUGGABLE SYSTEM FOR TREND-BASED ALLOCATION OF MEDIA ASSETS BETWEEN GLOBAL AND LOCAL STORAGE

CROSS-REFERENCE TO RELATED APPLICATIONS

This application claims benefit of U.S. Provisional Patent Application No. 62/277,852, entitled "METHOD AND PLUGGABLE SYSTEM FOR TREND-BASED ALLOCATION OF MEDIA ASSETS BETWEEN GLOBAL AND LOCAL STORAGE," by Dean Perrine, Christopher D. Blandy, and Joseph P. Coffaro, filed Jan. 12, 2016, which application is hereby incorporated by reference herein.

BACKGROUND OF THE INVENTION

1. Field of the Invention

The present invention relates to systems and methods for delivering media programs to consumers, and specifically to a pluggable system for allocating media assets between global and local storage based on identified trends.

2. Description of the Related Art

In the past decades, the delivery of media programs such as movies, television shows, and other audiovisual content to consumers has undergone several transformations. Early media program dissemination was accomplished primarily by wireless broadcast transmission on VHF and UHF (very high an ultra high frequencies) by local transmitters using a limited number of channels. This provided adequate resolution and serviced a large number of customers, particularly in metropolitan areas. However, individuals disposed in rural areas were typically incapable of receiving such broadcast transmissions, and the number of channels available were limited.

Later development of cable transmission systems solved this problem, providing television services to remote areas and offering many more channels of media programs. Like the wireless broadcasts that preceded them, cable transmissions included multiple channels, typically implemented by conventional modulation techniques. The installation of cables for such transmission was expensive, however, and gave rise to cable companies having virtual monopolies in serving particular geographical areas.

Satellite transmission systems solved this problem, since media programs could be broadcast over wide geographical areas at the same time. The high frequencies of such transmission offered both wide bandwidth for a large number of channels, and the use of smaller ground antennas, thus permitting unobtrusive installation in a wide variety of locations.

Still later, advances in video coding, digital subscriber lines (DSL) and the proliferation of fiber optic cable permitted widespread dissemination of media programs via the Internet. On-line media program providers such as NETFLIX and HULU provide services competitive in many respects to those provided by cable and satellite media program providers. Further, the content providers (entities that generate the media programs such as FOX and other movie and television studios) also provide media programs via the Internet.

Although technical advances have made the provision of media programs via the Internet feasible, such provision remains challenging, particularly with large number of subscribers, and a desire among customers for high quality (e.g. high resolution) video presentations.

At the same time, dissemination of media programs via the Internet offers the ability for viewers to receive media programs "on demand" (e.g. in response to a specific request for that media program), rather than receiving the media programs that are transmitted at a time determined by the media program provider. Such provision allows the customer to select from a broader range of media programs for viewing, and obviates much of the advantage of using digital video recorders (DVRs) to record real time broadcasts for later viewing. For example, since the media program is typically streamed to the viewing device, the media program provider can make it difficult or impossible to skip advertisements, as a customer might if the media program were recorded using a DVR.

The customer's ability to select from a broader range of media programs on an "on demand" basis places unique demands on the media program provider. Media programs, especially high resolution media programs, are quite large, and require a great deal of storage. Exacerbating storage requirements is the fact that different user devices have different processing and display capabilities, and the ideal coding parameters of a media program vary from device to device. For example, a smartphone has a small display, with smaller processing power than can be realized on a full-sized monitor and a large processor. Hence, a lower resolution version of a particular media program is more appropriate for a smartphone than a higher resolution version. Similarly, a low resolution version of a media program may be appropriate for use with a smartphone, but entirely inappropriate for a large display and a high capacity processor. As a consequence, the media program provider must either transcode the media program from a mezzanine (highest quality) coding to the desired coding before transmission, or store multiple versions, one for each possible desired coding quality. Storing multiple versions of multiple media programs requires a network of large capacity storage devices, and in many cases, the economy of scale is such that it is infeasible for media program providers to store all of the media programs of interest.

Consequently, media program providers often rely at least in part on what has become known as "cloud" storage. Cloud storage is a model of data storage in which the digital data is stored in logical pools, the physical storage (i.e. where the bits are actually manifested in a physical device) spans multiple servers (and often locations). Typically, the physical environment is typically owned and managed by a hosting company, which provides the storage for a fee. These hosting companies are usually responsible for keeping the data available and accessible, and the physical environment protected and running. Customers (including individuals and organizations) buy or lease storage capacity from the providers to store user, organization, or application data.

The temporal latency of the process of retrieving data items from storage and transmitting it to a client is also a factor. Storage can be categorized as "cold" (higher temporal latency, but typically lower cost) and "hot" (lower temporal latency, but typically higher cost). Of course, using the same analogy of temperature and data latency, storage may also be described as "tepid," or "lukewarm" or "ice cold" (also referred to "glacial"). Such storage may also be referred to as online storage (supporting frequent, rapid access to data), offline storage (used for back-ups or long-term storage with infrequent access to data, or nearline storage (representing a compromise between online and offline storage). The "temperature" of the data may also be determined by a other performance indicators such as the age of data, and database-related parameters such as the number of times a table or range partition was access, rows read, rows inserted or deleted.

Assuming the temporal latency across a population of customers is a performance metric to be minimized for improved service, hot storage is appropriate for media programs that are in high and/or frequent demand, while cold storage is appropriate for media programs that are in low and/or infrequent demands. The problems with this are twofold: (1) moving media programs from cold storage to hot storage is itself time consuming, and by the time this can be accomplished, service interruptions or failure to deliver the desired high quality media program to customers is the result; and (2) cloud storage typically does not provide the customer storing the data any visibility into where the data is physically stored, thus preventing the customer from knowing whether data stored in the cloud can be rapidly retrieved or not. Hence, there is a countervailing desire for the capacity and economy of cloud storage and a desire for visibility into the physical storage location of the data to determine whether it can be adequately provided to consumers.

There is therefore a need to identify uptrending media programs (media programs that are on the upswing in terms of interest to the consuming public) and downtrending media programs (media programs that are on the downswing in terms of interest to the consuming public), and to move media programs between cold and hot storage and in-between.

At the same time, each cloud storage services is typically accessed through cloud-unique a co-located cloud computer service, a web service application programming interface (API) or by applications that utilize the API, such as cloud desktop storage, a cloud storage gateway or Web-based content management systems. The problem is that such interfaces are typically home-grown, and thus different from storage hose to storage host. Since media providers may have media programs stored by more than one storage host (and in some cases, the different versions of the same media program stored by different storage hosts), there is no ability to manage and optimize storage across the media program provider's entire library of media programs. Further, it is advantageous to move uptrending media programs from cold to hot storage in physical locations geographically proximate the demand for the media programs. This desire to control the physical storage location of items antithetical to the notion of cloud storage itself (in which data storage is logically, rather than physically managed).

What is needed is a system and method that identifies trends in media to predict future demand for media program, and using these predictions, moves the media programs stored in a potential plurality of logical cloud storage hosts from cold to hot storage, preferably to physical storage locations to maximize the quality of service to the customer. The system and methods illustrated below satisfies these conflicting needs.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Figure 1:
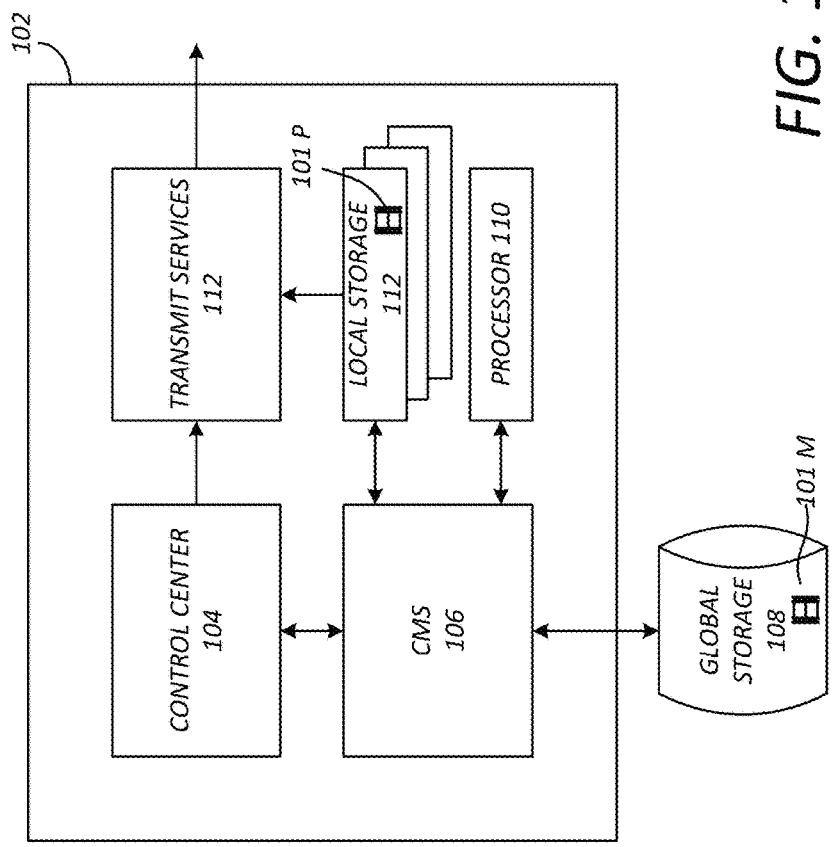
FIG. 1 is a simplified diagram of a media program provider, which processes, stores and retrieves media programs for transmission to consumers.

FIG. 1 is a simplified diagram of a media program provider 100, which processes, stores and retrieves media programs 101 for transmission to consumers. The media programs 101 may be provided directly to consumers (e.g. streamed via the Internet), or provided to consumers via service providers such as cable or satellite television providers. The media program provider 100 includes a headend 102, which comprises a control center 104, a content management system (CMS) 106, a processor 110, and one or more local storage assets 112. The media program provider 100 typically also includes one or more global storage assets 108. Global storage assets 108 are typically physically disposed remotely from the headend 102, and are used for long term storage of mezzanine versions of the media programs (denoted by 101 M). Mezzanine versions of media content assets are assets that are of highest available quality and data content. For example, a mezzanine asset may comprise a media program in the highest resolution, highest frame rate, including all related data (e.g. 3D, closed captioning in every available language) and metadata. Mezzanine assets are typically transcoded from the mezzanine version to another version (typically of lower quality or having reduced data) for transmission to consumers. For example, a mezzanine version of a media program may be transcoded into a 2080p or 2080i version suitable for transmission to a smartphone, and with closed captioning information appropriate for the geographical location to which it is destined to be received.

Such storage is typically provided by separate commercial entities than the headend 102 for a fee. Global (e.g. cloud) storage is typically "logical" storage as well. That is, the actual physical location of the media program is not known to the content management system content management system 106. In fact, the media program 101M may be globally stored in more than one physical location, or may be segmented into different portions, each of which may be stored in a different physical location.

While such storage is secure from data loss and is typically offered at a low cost, the performance of global storage 108 is typically insufficient for purpose of direct transmission of the media programs stored therein to consumers. Instead, when it is anticipated that a media program will be soon needed for transmission by transmit services 112, the control center directs the content management system 106 to retrieve the mezzanine media program 101M from global storage 108. The CMS 106 then provides the media program 101M to processor 110 where any processing required to transform the mezzanine version of the media program 101M into a processed version of the media program 101P. Such processing typically includes transcoding from the mezzanine format to a format suitable for transmission to the intended consumers. For example, the media program 101 may be transcoded from the mezzanine format to MPEG-4, at a 1080p resolution and a 30 fps frame rate. The processed media program 101P is then stored in local storage 112, preferably in a physical location geographically proximate the demand. The processed media program 101P is then provided to transmit services 112, which transmit the processed media program 101P.

The process of retrieving the mezzanine media program 101M from global storage 108, processing the mezzanine media program 101 M into a processed version of the media program 101 P can take a significant amount of time. Although this is not typically troublesome for scheduled transmission of media programs, it becomes problematic for unscheduled delivery of media programs. For example, if a consumer requests delivery of a media program on an "on demand" basis, the time to retrieve the mezzanine media program 101M, process it, and store the processed media program 101 in local storage 112 may be prohibitive.

Media Program Storage Allocation System—Overview

Figure 2:
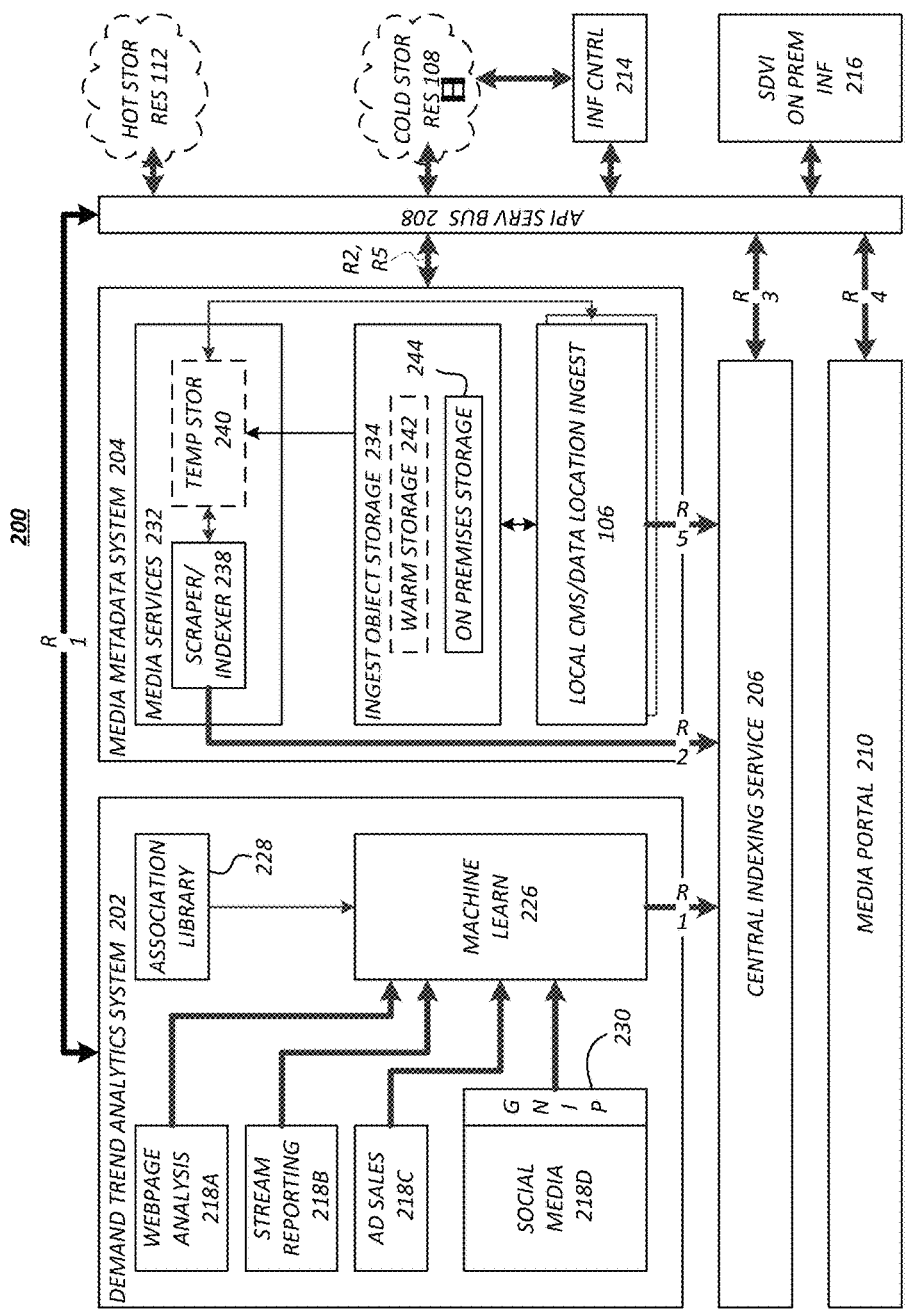
FIG. 2 is a block diagram of an exemplary media program storage allocation system.

FIG. 2 is a block diagram of an exemplary media program storage allocation system (MPSAS) 200. The MPSAS 200 comprises a demand trend analytics system (DTAS) 202, a media metadata system (MMS) 204, a central indexing service (CIS) 206, a media portal (MP) 210, an application program interface (API) service bus 208, a hot storage resource 210, cold storage resource 212, infrastructure controller 214, and on-premises infrastructure 216. Thick arrows (including those labelled R1, R2, R3, R4, and R5 as well those providing information to the machine learning module 226 and information to and from the API service bus 208) denote communications that can be performed in compliance with REST architectural constraints, thus permitting that the MPSAS 200 comprise a pluggable architecture, permitting off the shelf (or existing) systems, even cloud based systems, to perform the indicated functionality.

The DTAS 202 collects social networking data, and processes the collected social networking data to identify one or more trending topics related to globally stored media content objects such as the media programs. The DTAS 202 also provides the processed collected social networking data for use by other elements of the MPSAS 200. In one embodiment, this information is provided via a first REST-compliant method (denoted R1).

The MMS 204 scrapes media content objects such as media programs 101 to generate metadata of the media programs 101 (hereinafter alternatively referred to as media content objects), and provides the metadata of the media content objects 101 for use by other elements of the MPSAS 200, for example, the CIS 206. The scraped media programs 101 may be media programs 101 stored in local storage 112 or stored in global storage 108. The MMS provides the scraped media content object metadata for use by other elements of the MPSAS 200. In one embodiment, this is accomplished via a second REST compliant method (denoted R2).

The CIS 206 accesses the filtered collected social networking data and the metadata of the globally stored media content objects, generates an indexed database integrating the accessed filtered collected social networking data and the metadata of the globally stored media content objects, and provides the indexed database to other elements of the MPSAS 200. In one embodiment, the CIS 206 may comprise the SOLR enterprise search platform from the APACHE SOFTWARE FOUNDATION. SOLR is an open source enterprise search platform, written in JAVA. It permits full text searching, faceted searching, real time indexing of data. SOLR has REST compliant HTTP/XML and JSON APIs that allow it to be usable from most programming languages, and has a plugin architecture. The CIS 206 provides the central index to other elements of the MPSAS 200. In one embodiment, this is accomplished by a third REST compliant method (denoted R3).

Finally, the MP 210 accesses the indexed database generated by the CIS 206 and searches the indexed database to identify globally stored media objects 101 having a required correlation to the identified trending topics, and processes the identified globally stored media objects for local or hot storage. In one embodiment, the required correlation is user-configurable to different threshold values. The MP 210 accepts information and provides commands to other elements of the MPSAS 200. In one embodiment, this is accomplished via a fourth REST compliant method (denoted R4).

An API service bus 208 is communicatively coupled to the MMS 204, the CIS 206, and a media portal 210. The API service bus 208 translates commands and responses from the MMS 204, CIS 206 and media portal 210 of the MPSAS 200 to external entities including local (hot) storage resource 112, global (cold) storage resource 108, infrastructure controller 214 and on premises infrastructure 216. In one embodiment, the API service bus 208 communicates with other elements of the MPSAS 200 using the methods described above.

The media portal 210 is an application that a user uses to interface with the API service bus 208. The media portal 210 accepts information regarding globally and locally stored media objects and provides this information to the user, and also accepts user commands regarding the management of the globally and locally stored media objects and provides those commands to the API service bus. An exemplary user interface implemented by media portal 210 is illustrated in FIG. 4 below.

As described above, elements of the MPSAS 200 are communicatively coupled to exchange information in conformance with representational (REST) architectural constraints. The REST architectural constraints place limits on interaction between the elements, standardizing the syntax and means by which the elements communicate with one another. The result is that the architectural elements are essentially "pluggable," allowing one version of an architectural element to be substituted from another version (which may be obtained from a different vendor) without any significant change in the operation in the MPSAS 200 or change in the other architectural elements.

Representational State Transfer Architecture

In one embodiment, such provision is accomplished via method complying with representational state transfer (REST) architecture constraints. REST is the software architectural paradigm of the World Wide Web that gives a coordinated set of constraints to the design of components in a distributed hypermedia system. By limiting the design of the components to such constraints, REST permits a "pluggable" architecture. Specific interaction constraints are applied to components, connectors, and data elements.

Applications conforming to all such constraints are known as RESTful, and allow an integrated system to be constructed of architecturally and economically independent elements (e.g. from hosts owned by different commercial entities). Important characteristics of a RESTful architecture include:

Client/Server Model with Uniform Interface:

A uniform interface that separates clients and servers. This relieves clients from being concerned with data storage (which remains internal to the servers), so that the portability and pluggability of the client code is made possible. At the same time, servers are not concerned with the user interface or user state, enhancing scalability of the servers. So long as the interface between clients an servers complies with the RESTful architecture, clients and servers may be developed independently and replace by other clients and servers conforming to the same interface.

Stateless Protocol:

Client-server communication is further constrained by no client context being stored on the server between client requests. Each request from any client contains all the information necessary to service the request, and state of the session between the client and the server is maintained in the client. The session state can be transferred by the server to another service such as a database to maintain a persistent state for a period and allow authentication. The client determines when it is ready to make the transition to a new state and begins sending requests. When client requests to transition to a new state is pending, the client is considered to be in transition. The representation of each application state contains links that may be used the next time the client chooses to initiate a new state-transition.

Cacheable Responses:

Responses to client request must define themselves as cacheable or uncacheable to prevent clients from reusing stale or inappropriate data in response to future requests.

Layered System:

A client cannot ordinarily tell whether it is connected directly to the end server, or to an intermediary along the way. Intermediary servers may improve system scalability by enabling load balancing and by providing shared caches. They may also enforce security policies.

Uniform Interface:

A uniform interface constraint is fundamental to the design of any RESTful system. This interface decouples the architecture of the elements of the system, enabling each to operate and evolve independently. The uniform interface includes four constraints:

Identification of Resources:

Resources (such as data objects) are identified in requests, for example, using uniform resource identifiers (URIs) in web-based REST systems. The resources themselves may be conceptually separate from the representations that are returned to the client. For example, the client may receive a data request in HTML or XML, even if the data is not internally stored by the server as HTML or XML.

Manipulation of Resources Through Client Representations:

When a client holds a representation of a resource, including any metadata attached, it has enough information to modify or delete the resource.

Self-Descriptive Messages:

Each message includes enough information to describe how to process the message. For example, which parser to invoke may be specified by an Internet media type (previously known as a MIME type).

Hypermedia as the Engine of Application State (HATEOAS):

Clients make state transitions only through actions that are dynamically identified within hypermedia by the server (e.g., by hyperlinks within hypertext). Except for simple fixed entry points to the application, a client does not assume that any particular action is available for any particular resources beyond those described in representations previously received from the server.

To the extent that systems conform to the constraints of REST they can be called RESTful. RESTful systems typically, but not always, communicate over Hypertext Transfer Protocol (HTTP) with the same HTTP verbs (GET, POST, PUT, DELETE, etc.) which web browsers use to retrieve web pages and to send data to remote servers. Central indexing service 206 uses REST to interface with external systems using resources identified by Uniform Resource Identifier (URI), for example /people/tom, which can be operated upon using standard verbs, such as DELETE/people/tom.

Web service APIs that adhere to REST architectural constrains are known as RESTful APIs. Such APIs can be defined according to a base URI (such as a collection of resources defined by a base URI such as http://media.com/resources or an element of the collection of resources defined by http://media.com/resources/movie1), an internet media type for the data (e.g. JPG or MPEG), a standard HTTP method such as GET, PUT, POST or DELETE, hypertext links to a reference state or reference-related resources.

In an exemplary embodiment, the GET method, when used in conjunction with a resource having a collection of elements returns a list of the URIs of the collection elements, and when used in conjunction with a resource that is an element of a collection, retrieves a representation of the addressed element. Similarly, the PUT method, when used in conjunction with a resource comprising collection of elements, replaces the entire collection with another collection of elements, and when used in conjunction with a resource that is an element of a collection, replaces the addressed element of the collection or creates the element if no similarly addressed element existed. Also, the POST method, when used in conjunction with a resource having a collection of elements, creates a new entry in the collection. Typically, the URI of the new entry is automatically assigned and returned by the operation. A POST command is not typically when referring to a resource that is an element of a collection, but the addressed member may be treated as an collection f resources and a new entry created in that new collection. Finally, the DELETE method, when used in conjunction with a resource having collection of elements, deletes the entire collection, and when used in conjunction with an element of a collection, deletes the addressed element of the collection.

Applying REST principles to the MPSAS 200 describe above, the DTAS 202 may provide the filtered collected social networking data to the indexing service to the central indexing service 206 via a REST-compliant method (R1) such as the POST command. Further the MMS 204 may provide metadata obtained by scraping the globally stored media content objects to the indexing service 206 via a REST compliant method (R2). Further, the central indexing service 206 may provide the indexed database to the media portal 210 via the API server bus 208 via REST compliant methods, and the media portal 210 may process the globally stored media objects for hot storage 240 via a REST compliant method (R3).

The MMS 204 may comprise a content management system (CMS) 236 that manages the retrieval of content from warm storage 242 and storage of that content in temporary storage 240 for operation by the scraper/indexer 238, as well as determining the physical storage location of that content as further described below. Those data locations can be provided to the central indexing service 206 via REST compliant methods (R4) and commands from the media portal 210 to manage the storage of content may be provided to the MMS may also interface with the MMS 204, particularly the media services module 232 via REST compliant methods, via the API service bus 208.

Demand Trend Analytics System

The DTAS 202 comprises a machine learning module 226 that accepts data from an association library 228 and demand data sources 218A-218D. The demand data sources 218-118D (hereinafter alternatively referred to herein as demand data source(s) 218) may comprise a web click through module 218, a streaming trend module 218B, an advertisement sales module 218C and a social media module 218D. As shown in FIG. 2, data may be provided from these sources via REST compliant commands and methods.

The webpage analysis module 218A monitors websites relating to the media program provider's content for click-throughs and other user input. For example, a particular media program series (e.g. the SIMPSONS) may be the subject of a plurality of inter-related webpages on a web portal at a web address (e.g. www.fox.com/the-simpsons). That web portal may include links to full episodes of the media program series and other ancillary information. Users visiting that website may select different controls on the webpage to obtain other information (known as click-throughs). These user commands can be monitored, with the monitored results transmitted to the machine learning module 226. Any known information regarding the user click-throughs may be included in the monitoring information transmitted from the webpage analysis module 218A to the machine learning module 226, including (if available), the identity or demographic characteristics of the user (e.g. their approximate age, geographic location and sex) and the time of the click through(s). For example, perhaps because of a recent news story, a particular clip or episode of the SIMPSONS may be of interest to a greater number of users than usual, and that may be reflected in trending increase in the number of click throughs to that particular clip or episode. The webpage analysis module 218A considers other webpage related input as well, including search terms entered by users.

The stream reporting module 218B monitors which media programs are being streamed to users. For example, this module 218B may report all incidents of streaming of a particular clip or episode of the SIMPSONS, thus allowing the machine learning module 226 to determine if that particular clip or episode is being streamed to a greater number of users. Stream reporting module 218B may report the stream being transmitted, as well the temporal location within the media program that the streaming began and ended. Thus, streaming module may report not only that a particular media program has been streamed, but which portions of the media program, in which resolution, to what kind of devices, and in which geographical locations. Accordingly, the stream reporting module 218B may report that a user in Redondo Beach began streaming SIMPSONS episode 201 from a time 2:19 within the program to a time 3:10 within the program, and that this streaming was at low resolution to a smartphone or similar device using APPLE's HTTP live streaming protocol. Streaming of a greater number of other users than usual of the same (or approximately the same) portion of the episode is an indication that the episode is of greater interest and perhaps should be moved from cold storage 212 to hot storage 210 as described further below. Information regarding the resolution and protocol of the requested streams can be used to command a transcoder to transcode the episode (or portion of the episode) into versions suitable for the indicated demand before storing those versions in hot storage 210 in physical storage in a geographic location that minimizes latency and maximizes performance for expected viewers. The stream reporting module 218B may also be used to report that users are reviewing one particular portion of a sporting contest (live or pre-recorded) to view a particular play or event.

The advertisement sales module 218C provides information describing advertising sold with respect to the media programs of interest. For example, if there is greater interest in advertising for a particular media program, it is an indication that the interest in the underlying program itself is trending upward.

The social media module 218D scrapes social media outlets such as TWITTER, FACEBOOK, YOUTUBE, TUMBLR, INSTAGRAM, FOURSQUARE, GOOGLE+ and others, and provides that information to the machine learning module 226. In one embodiment, that information is collected from the social media outlets by a social media API aggregation entity such as GNIP.

The process of using modules 218A-218D to obtain trending data can be accomplished continuously, at a period suitable to support the timely transfer of media programs from global to local storage as needed, or aperiodically or in response to a user command.

The machine learning module 226 also accepts input from an association library 228. The association library comprises a repository of information that can be used to discover and establish relationships between keywords. In one embodiment, this association library comprises information ingested from an information source such as WIKIPEDIA by scraping the entire WIKIPEDIA site.

Consider the example of "Joe Montana." Since the repository has an webpage entry for "Joe Montana" that describes his "football" career, the association library provides information by which it can be ascertained that the keywords "Joe Montana" are to be associated with the keyword "football." "Joe Montana" may also be associated with "San Francisco" or "49ers," "Notre Dame," "quarterback," and a number of different other keywords. A WIKIPEDIA entry about Joe Montana would include such words, and they would therefore be associated or related keywords. In addition, they keyword "football" in a WIKIPEDIA entry about Joe Montana may reference another WIKIPEDIA entry about the U.S. football (one tier distant from the entry regarding Joe Montana) and that WIKIPEDIA entry may reference another football player (e.g. John Elway) (two tiers distant from the WIKIPEDIA entry about Joe Montana.

Using the keyword relationships and associations from the association library 228, web click through information from the webpage analysis module 218A, advertisement sales information from the ad sales module 218C, and social media information from the social media module 218D the machine learning module 226 implements an iterative machine learning algorithm that can be used to identify trending topics. For example, a learning algorithm may be employed to perform logical regression that seeks to find the best hyperplane that separates two sets of points in a multi-dimensional feature space. This can be used to classify data as trending or not trending. In one embodiment, this is implemented using a SPARK MLIB machine learning library. The library comprises common learning algorithms and utilities, including utilities that perform classification, regression, clustering, collaborative filtering, dimensionality reduction, as well as lower-level optimization primitives and higher-level pipeline APIs. Basic statistical analysis is supported, including summary statistics, correlations, stratified sampling, hypothesis testing, and random data generation. It also comprises common learning algorithms and utilities, including classification, regression, clustering, collaborative filtering, dimensionality reduction, as well as lower-level optimization primitives and higher-level pipeline APIs. Clustering attempts to group subsets of entities with one another based on some notion of similarity. Clustering can be used to identify keyword relationships. For example, a relationship between Joe Montana and John Elway, by virtue of those keywords both being associated with football quarterbacks. Different models can be supported, including K-means, Gaussian mixture, power iteration clustering, latent Dirichlet allocation (LDA) and streaming K-means.

The machine learning module generates an index of keywords and relationships among the social media and other trending sources. That index is provided to the CIS 206, where this index is combined or integrated with the index created by the media services module 232 of the MMS 204 to create a central index.

Typically, keywords are determined to be have a relationship when one keyword is linked to another keyword in the association library. Further, they are determined to more related when there are either closer related (in adjacent or close tiers) or the keywords are related through multiple paths (e.g. Joe Montana and John Elway) both competing in Super Bowls, or both being guests on a particular talk show.

Other sources may also be used to generate keyword relationships. For example, databases such as the Internet Movie Database (IMDb) may be scraped for information as well. The result of the keyword relationships and associations are provided to the CIS 206, preferably in a REST compliant command such as a POST command or method.

Typically, this the DTAS 202 continuously updates information from demand data sources 218 and relationships from association library 228 and using the machine learning module 226 to identify demand trends. These updates can also be performed upon command (e.g. via media portal 210) or automatically, based on pre-defined categories.

In one embodiment, the machine learning module 226 of the DTAS 202 provides the central indexing service 206 with indexed information hat only for items that have been identified as within one of a number of predefined categories, this relieving the central indexing service 206 of the burden of handling information that is clearly not relevant to such categories. For example, if the system 200 is directed primarily to sports-related categories of topics, the machine learning module 226 will provide only indexed information that is related to such topics.

Media Metadata System

While the DTAS 202 continuously provides analytics with regard to the trending demands of a media program provider's media programs, the MMS 204 examines the media programs available from the media program provider 100 to obtain metadata about the media programs 101 available from the media program provider 100.

The CIS 206 compares the trending data obtained from the DTAS 202 with this metadata to identify media programs that are relevant to the identified trends, and permitting the central indexing service 206 to identify which of media programs 101 are predicted to be of increased interest by consumers.

The MMS 204 provides the ability to scrape media program content for all text-based information. Such information may include closed captioning information, titles, metadata. For example, a media program such as a movie may include metadata describing the director, producer, writer(s), cast and crew. A live media program such as a football game may include data including each player of each time, which players are carded to playing in the tame, the current performance of each player, the position each player plays on the football game, where the tame is played, the identity of the referees, and so forth. The live media program will also typically include closed captioning, which can also be scraped (e.g. read from) the media program. Such closed captioning typically includes a textural representation of the dialog of the live media program.

The MMS 204 comprises a media services module 232, an ingest object storage module 234, and one or more localized content management systems 106, typically at a plurality of different physical locations.

Each of the local content management systems (CMS) 106 manage the ingestion, storage, and retrieval media programs using the on-premises physical storage 244 at the particular location of the CMS 106. The CMS 106 commands the storage and retrieval of media content assets to and from ingest object storage 234 and the media services module 240. Ingest object storage 234 may include local storage 112 or other on-premises storage 244, and/or global "warm" storage 242. Warm storage 242, as the name implies, is storage that from which data may be more easily or rapidly retrieved than cold storage 108, but not as rapidly received or retrieved as on premises 244 or hot storage 112. For example, the CMS 106 may retrieve a mezzanine media program 101 M from cold storage resource 108 and store the retrieved mezzanine media program 101 M in ingest object storage 234. This media program 101 M may then be provided to the media services module 232, where it is stored in temporary storage 240. The scraper/indexer 238 of the media services module 232 retrieves the media program 101 from temporary storage 240 (or the CMS 106) and scrapes the media program to retrieve metadata describing or related to the content of the media program 101. This can be accomplished when the media program 101 is initially ingested (e.g. upon receipt of a new media program). This metadata is indexed by the scraper/indexer 238 and provided to the CIS, preferably via the fourth REST method or command (denoted R5).

Since the CMS 106 manages the physical storage of media content assets, the CMS 106 knows where each data asset (e.g. media content) is physically stored, and this information is provided to the centralized indexing service 206. This information is provided to the media portal 210 (directly via a fifth method (denoted R5) or via the API service bus 208), thus allowing the media portal 210 to determine where media programs are physically stored, to process them as required to prepare them for transmission, and to move them from cold storage 108 to hot storage 112.

For example, if the central indexing service 206 and media portal determine that Joe Montana is a topic of increasing interest to the public in the San Francisco bay area using smartphones (using data from the demand trend analytics system 202), and it is also determined that there are a number of media programs having metadata including the keywords "Joe Montana," (using data from the media metadata system 204) the central indexing service 206 (using information from each CMS 106 regarding the physical storage location of those media programs) may determine that suitably processed versions of these media programs exist in the network, but are physically stored in locations too remote from the San Francisco bay area to provide service adequate for the anticipated demand. The CMS 106 or other infrastructure elements 216, responding to commands from the media portal 210 may command that the processed versions be moved to storage geographically proximate the San Francisco bay area. Or, the CMS 106 or other infrastructure elements 216 may instead command that mezzanine versions of these media programs 101 M be retrieved from cold, global storage 108, and provided for processing to transcode them to versions suitable for transmission to the devices of interest (smartphones) and store those transcoded media program versions in hot storage 112 geographically proximate the San Francisco bay area.

Central Indexing Service

As described above, the DTAS 202 and MMS 204 each include an indexing service which generates an index of the keywords and other data they generate. Typically, this information, along with the physical storage location of stored media programs 101 is provided to the CIS 206 using REST-compliant methods or commands. The CIS 206 accepts this information and integrates this data, generating a central index addressing the data from the DTAS 202, the MMS 204, and each local CMS 106. This central index is used by the media portal 210 via the API service bus 208 to identify media programs 101 of trending interest, and move them from cold storage 108 to hot storage 112, with any necessary transcoding performed as well.

API Service Bus

The API service bus 208 is communicatively coupled to the MMS 204, the CIS 206, and the media portal 210. The API service bus 208 is also communicatively coupled to hot storage 112, cold storage 108, the infrastructure controller 214, and an on premises infrastructure elements 216. Such infrastructure elements 216 may include transcoders, storage elements (hot and cold) video processing elements, transmit services 112, web services (to which webpage analysis module 218A and stream reporting module 218 interface in order to obtain data for trend analysis). In one embodiment, the on-premises infrastructure 216 is controlled using software defined networking (SDN).

SDN allows management of network assets through abstraction of higher-level functionality. This is accomplished by decoupling the system that makes decisions regarding where network traffic is routed (the control plane) from the underlying systems that forward network traffic to the selected destination (the data plane). Such decisions may be expressed in REST-based HTTP commands that may be provided via the media portal.

Media Portal

Media portal 210 provides an interface with other elements of the MPSAS 200, via the API service bus 208. An exemplary embodiment of the user interface presented by the media portal 210 is presented below.

Figure 3:
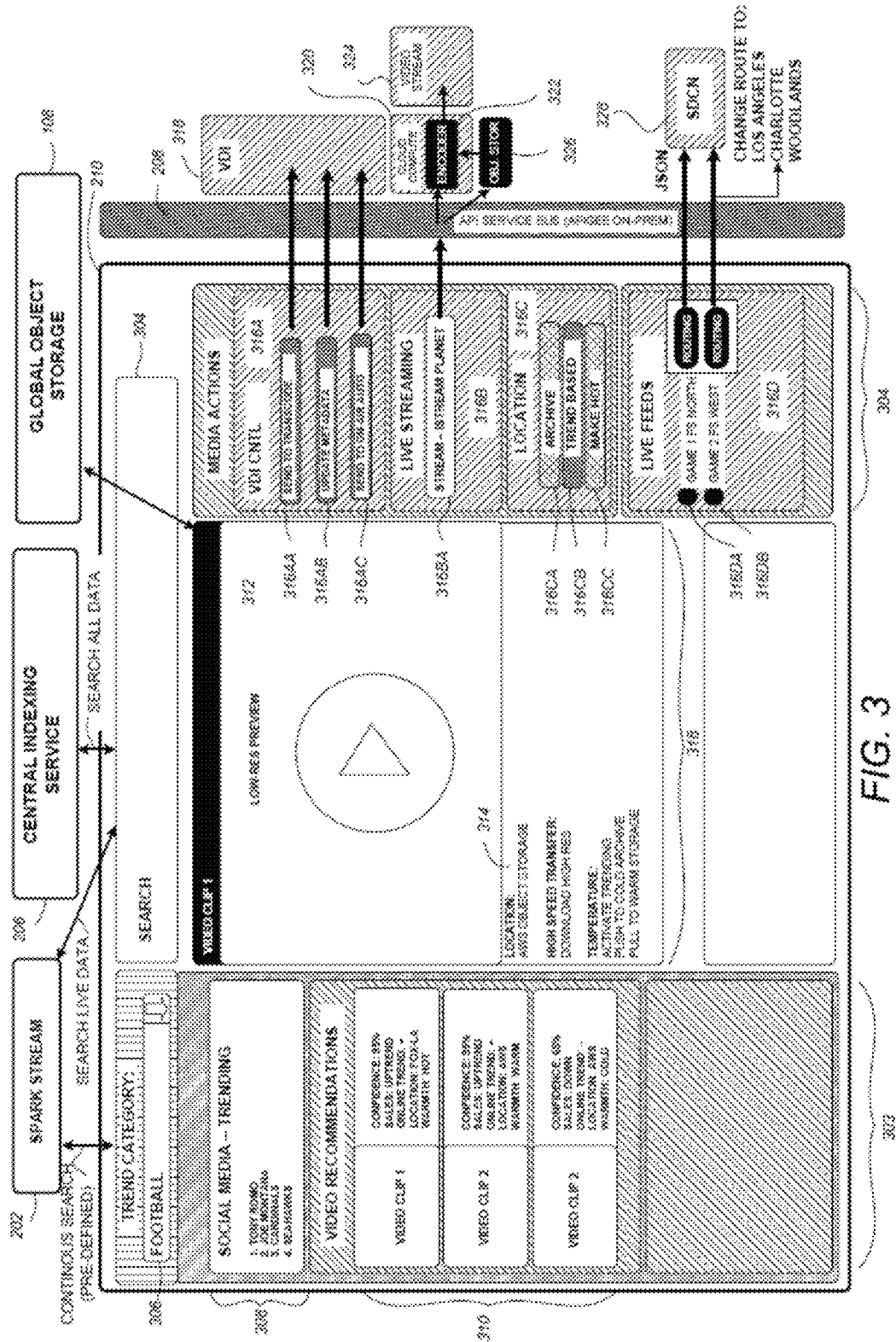
FIG. 3 is a diagram presenting an exemplary user interface provided by the media portal and illustrating interfaces with other media program storage allocation system elements.

FIG. 3 is a diagram presenting an exemplary user interface 302 provided by the media portal 210 and illustrating interfaces with other MPSAS 200 elements. In the illustrated embodiment the user interface 302 includes a trend portion 303, a media control portion 316, and a preview portion 318. The trend portion 303 includes a trend category control 306 that allows the user to select a category of trends to search for. In one embodiment, the trend category control 306 is a drop-down control that allows the user to select from a number of trend categories.

In one embodiment, the trend categories available to the user for such selection may be pre-defined. Hence, the MPSAS 200 may be continuously ingesting information and identifying trends related to these pre-defined categories as the information is ingested, and correlating that ingested information with media programs of the pre-defined categories. When the user uses the trend category control 306 to select a particular pre-defined category, social media trends and video recommendations correlating to those social media trends are retrieved. The user may also search for any category or item of interest using keywords entered into the search box 304 described further below.

Trend categories or genres may be hierarchically organized. For example, a top-level hierarchy may include news, analysis and interpretation, documentary, religion, education, sports, drama, comedy, music, variety, game shows, reality, interstitials, public service announcements, and the like. Selecting "sports" may present another category for selection, such as the type of sports (e.g. football, baseball, hockey, soccer, or UFC). Finer gradations of trend categories may also be used. For example, separate trend categories could be offered for professional (e.g. NFL) and amateur (e.g. NCAA) sports, or for regional sports (e.g. the PAC-12).

Returning to FIG. 3, the user may select "football" as a trending category, which commands the DTAS 202 to return information identifying football related data trending on social media. The results of this search are shown in trending results portion 308. In the illustrated embodiment, the results are presented in order of greatest upward trend (e.g. the first result is more strongly trending upwards than the second result and so forth). In the example presented, the user has entered a trend category of football, and the trending topics are Tony Romo, Joe Montana, the Arizona Cardinals, and the Seattle Seahawks. The trend portion 303 also comprises a video recommendation portion 310, arrived at by comparison of the trending data from the DTAS 202 with the metadata provided by the MMS 204. The video recommendations presented in the video recommendations portion 310 include three video clips. In the illustrated embodiment, the recommendations include data indicating the confidence of the recommendation, an indication of which the trend data sources 218 resulted in the uptrend identification of the media program (e.g. sale, on-line trend), the current storage location of the recommended media programs (e.g. FOX-LA, indicating that video clip one is stored at the FOX facility in Los Angeles), and the "warmth" of the storage assets that the media program is currently stored in.

For example, the first recommended media program is a video clip for which sales and online assets such as webpage and stream reporting has indicated is an upward trend with 96% confidence. The video clip is currently physically stored in a facility in Los Angeles in hot storage 112. The second recommended media program is also recommended with 96% confidence, based on upwards trend in both ad sales 218C and online data 218A, 218B and 218D. However, this data is stored in the cloud using "warm" storage in the cloud. The third video clip is recommended with 68% confidence, with ad sales data 218C indicating a downward trend, but online data sources 218A, 218B and 218D indicating a downward trend. The third video clip is also stored in global storage "cold" storage 108.

Based on the foregoing data, the user may want to preview one of the video clips. Since the first video clip is already in hot storage, the user may consider moving the second video clip or the third video clip into hot storage, so the user may preview either video clip by selecting the portion of the video recommendation portion 310 associated with the video clip of interest. After doing so, the media program is retrieved from cold storage 108 and played in the preview portion 318. If the media program is stored in cold storage 108 (for example, video clip three), a low resolution version of the media program may be retrieved from global storage 108 for preview. Alternatively, the system may always store low resolution versions of media programs in hot storage (or at least, storage that is hot to the media portal 210 for preview use, although such versions may be unsuitable for transmission to customers. Previewed videos may be transcoded to a different version than stored versions as required by the video player implemented by the web portal 210. The preview portion 318 includes both a playback portion 312 in which the media program itself is previewed, and a metadata portion 314 which presents metadata and other information about the video clip. The metadata may include the location of the stored clip being previewed, an indication of the current status of the data transfer (e.g. downloading a high resolution version of the media program), and the current status of the media program (e.g. whether it is automatically transferred to warm storage if it is identified as trending, pushed to cold storage or pulled to warm storage.

The media actions portion 316 allows the user to perform actions on the selected media program of interest. Such actions are received, and interpreted or translated as necessary by the API service bus 208 and provided to the system that is the target of the command.

Such target systems include a video distribution infrastructure (VDI) 318. The VDI 318 is a suite of infrastructure management applications and services that enable dynamic management of third party applications and resources to provide content to consumers, either by broadcast television (including satellite and cable transmission) as well as the Internet. Importantly, unlike traditional video distribution systems which rely on interconnected hardware performing assigned functions (e.g. a transcoder hardwired to a statistical multiplexor) such systems are software controllable and re-configurable. The VDI architecture permits (1) media infrastructure to be programmably defined and implemented very rapidly and potentially on-demand, (2) the sharing such media infrastructures with other services.

Another target system includes a cloud computing platform 320, communicatively coupled to transmit encoded media programs a video streaming server 324. The cloud computing platform 320 may include one or more video encoders 322, which encode or transcode the media program to the appropriate format for transmission, as well as storage 326 available to the cloud computing platform 320 for performing such encoding operations. The platform 320 may be a third party platform such as available from AZURE or AMAZON, or may be a local platform.

Another target system includes a software driven cloud network (SDCN) 328 such as is available from ARISTA used route live feeds to particular locations.

The media action portion 316 includes a virtual distribution infrastructure (VDI) control subportion 316A that provides commands to control the VDI 318. The media action portion 316A includes a first control 316AA that sends the currently selected media program to the VDI 318 for transcoding, a second control 316AB that updates the metadata in the currently connected media program, and a third control 316AC that sends the currently selected media program to the on-air automated transmission system that accepts timeline of media an advertisements, and assembles them into the broadcast programming. These commands are transmitted to the API service bus 208, which interprets the VDI 216 command to generate a command compliant with the VDI system 318.

The media action portion 316 also includes a live streaming portion 316B having a live streaming control 316BA by which the user may command the media program be provided for transcoding using transcoder 322 and/or live streaming, again via an API service bus 208 interpreted command. The API service bus 208 may interpret a command for the streaming entity to prepare a media program for streaming by instructing that the media program be provided from the current storage location to the streaming entity.

Using this control, the user can command encoder 322 in the cloud computing platform 320 to encode a media program and provide the encoded media program for streaming by video streaming server 324. For example, the user may command the cloud computing platform 320 to retrieve the media program from object storage 326, encode it into high and medium resolution versions for transmission via HTTP or TCP/IP, and a low resolution video consistent with the APPLE HLS, all with a selection of a single control, and may be implemented using REST-ful compliant commands, as described above.

The media action portion 316 also includes a location portion 316, having controls 316CA-316CC, which indicate and control the storage status of the currently selected media program is stored, and allows the user to command a change in that status. In the illustrated embodiment, the currently selected media program is stored in trend-based storage (where it is automatically moved based on trend data) as indicated by the darkening of control 316CB, but it may be commanded to be permanently stored in cold or glacial (archive) 108 or hot storage 112 by user selection of the control 316A or 316C associated with the desired location. Similarly, if the currently selected media program were currently stored in cold storage (which would be indicated by a darkened control 316CA), it could be designated for automatic selection between cold 108 or hot storage 112 according to trends by selection of control 316CB.

In another embodiment, the location portion 316C has subportions, indicating the storage status of different versions of the selected media program. For example, the location subportion 316C may comprise two columns, each with controls analogous to those of 316CA-316CC, that permit the separate management of a low resolution version of the media program and a high resolution version of the media program (e.g. storing the low resolution version in hot storage, and the high resolution version in trend-based storage).

The media action portion also permits routing of live feeds that are provided for rebroadcast by other media program providers, using live feed media action portion 316D. Such live feeds might include live broadcasts of sports contests on regional sports networks (RSNs). For example, the current live feeds may include a feed of first football game from first regional sports network, as indicated by annunciator 316DA, and a feed of a second football game from a second regional sports network as indicated by annunciator 316DB. The routing of either of these feeds can be viewed by selection of the associated control 316DA, 316DB within the live feed media action portion 316D, and rerouted as desired. For example, game 2 may be rerouted from Los Angeles based video servers to servers based in Charlotte. This may be appropriate, for example, if one of the teams is from the Charlotte area. The foregoing can be accomplished via an open standard format used to transmit data objects using attribute-value pairs such as JavaScript Object Notion or JSON.

Figure 4A:
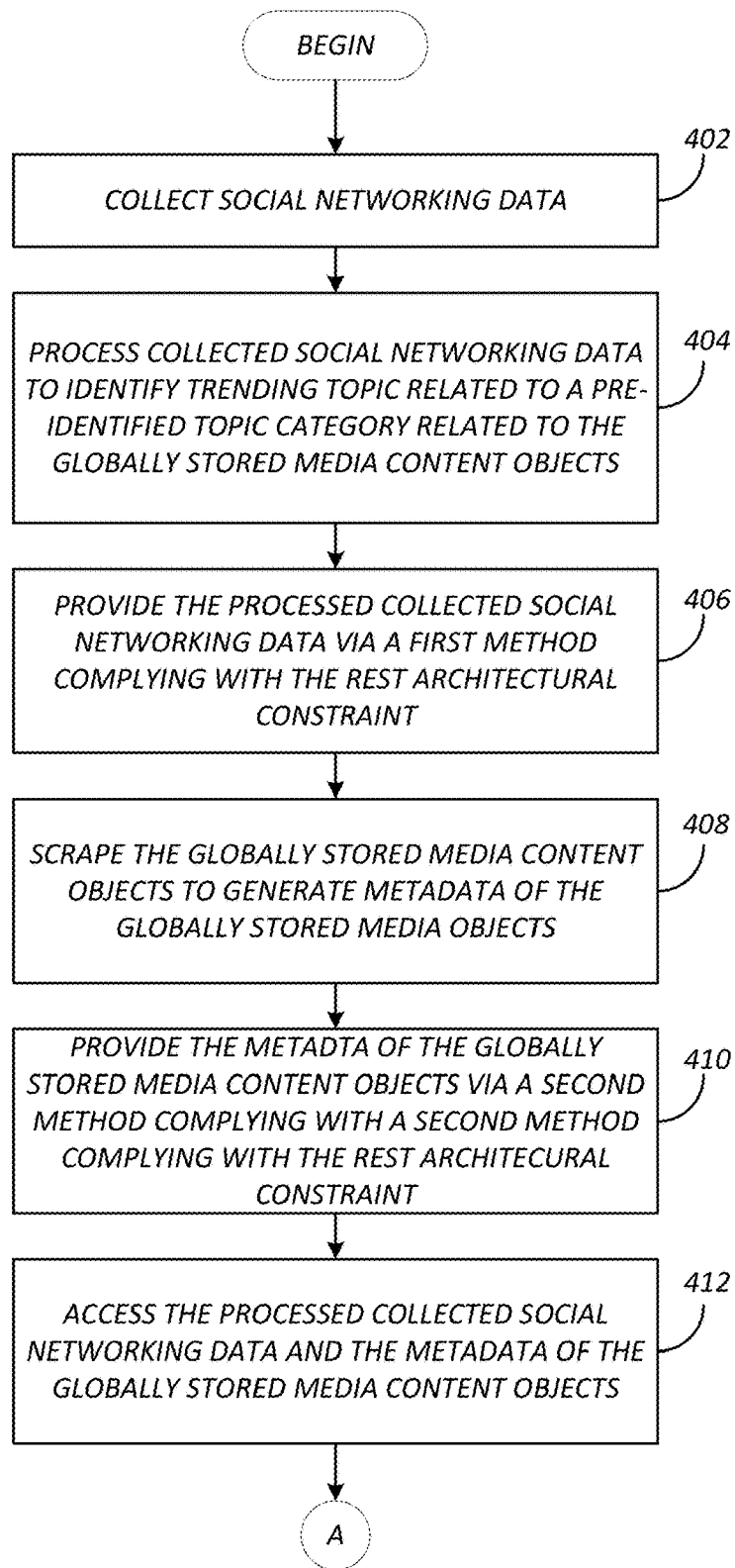
FIGS. 4A and 4B are flow charts describing an exemplary process for managing the retrieval and provision of globally stored media content objects.
Figure 4B:
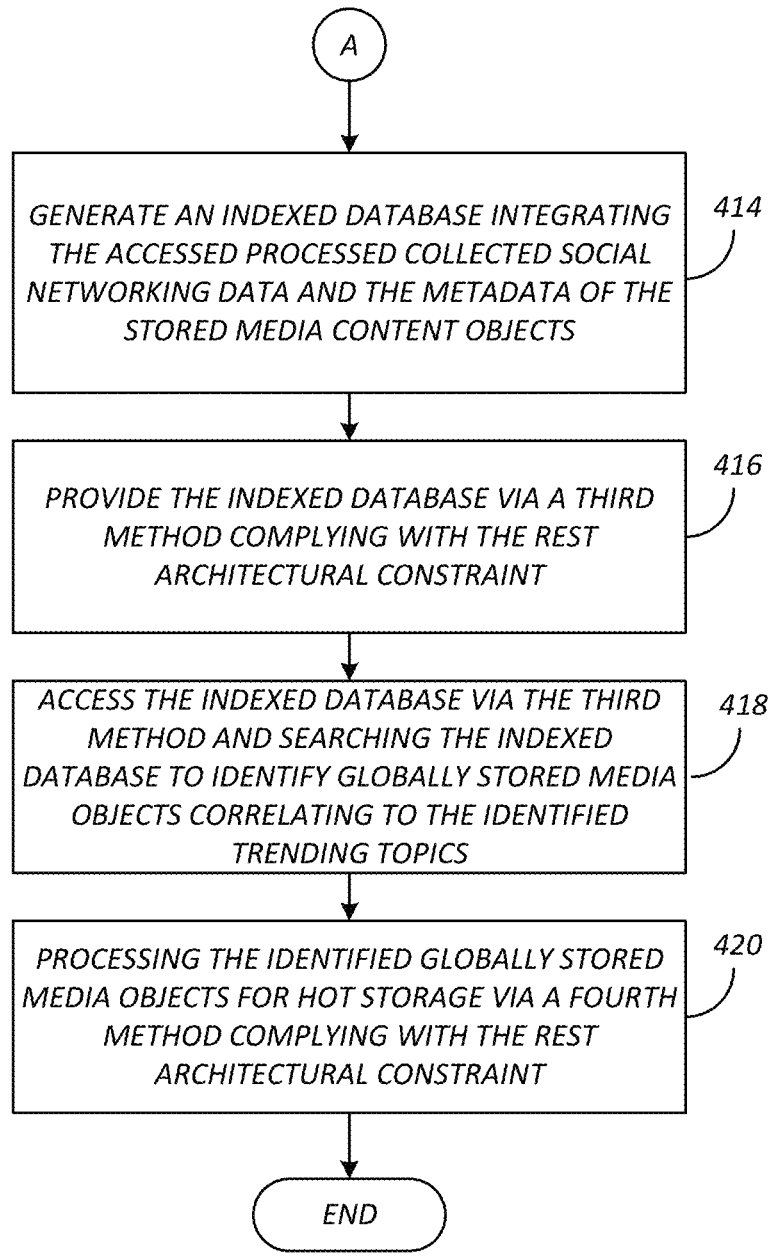

FIGS. 4A and 4B are flow charts describing an exemplary process for managing the retrieval and provision of globally stored media content objects. Turning first to FIG. 4A, social networking data is collected, as shown in block 402. The collected social networking data is processed to identify trending topics related to the globally stored media content objects, as shown in block 404. This can be performed, for example, by the DTAS 402 described above. In one embodiment, the identified trending topic is related to a pre-identified topic category (e.g. sports, movies, episode series). This can expedite and simplify the identification of the trending topics, and also allows the MPSAS 200 to respond to specific topics identified by the user of the MPSAS 200 using the media portal 410 as further described below.

In block 406, the processed collected social networking data is provided to other elements of the MPSAS 200, for example, the central indexing service 406. Preferably, this is accomplished via a method or command that complies with REST architectural constraints, to permit the use of a variety of existing "off the shelf" indexing services, because any such indexing service complying with the REST architectural constraint will respond to the provided methods or commands. One command or method may be a PUT command. Typically, the collected social networking data provided by the DTAS 402 to the CIS 406 is raw, text based data, but may be of different format, depending on the needs of the CIS 406.

In block 408, the globally stored media content objects are scraped to generate metadata describing the globally stored media objects. In block 410, this metadata is provided to other elements of the MPSAS 200, for example, the central indexing service 406. Again, this is preferentially accomplished via a method or command that complies with the REST architectural constraints. In block 412, the processed collected social networking data and the metadata of the globally stored media content objects are accessed.

Turning to FIG. 4B, block 414 depicts the generation of an indexed database that integrates the accessed processed collected social networking data received from the DTAS 402 and the metadata of the stored media content objects received from the MMS 404. That indexed database is provided to other elements of the MPSAS 200, preferably using methods and/or commands compliant with REST architectural constraints. One of the elements to which the indexed database is provided is a media portal 410. In block 418, the indexed database is accessed and searched to identify globally stored media objects correlating to the identified trending topics. In one embodiment, the user of the media portal 410 can specify a threshold level of correlation to categorize a topic as "trending," thus reducing or increasing the number of stored media objects that sufficiently correlate to the identified trending topics. The globally stored media objects correlating to the trending topics may also be prioritized, so that those globally stored media objects are presented in order of correlation.

In block 420, the identified globally stored media objects are processed for host storage. In one embodiment, this comprises retrieving the identified globally stored media objects, and storing them in warmer storage such as the storage managed by the media program provider or host.

Although the foregoing has been described in terms of an entity such as a media program provider 100 using the MPSAS 200 to intelligently manage the cloud-based storage, processing, re-storage, and retrieval of media programs ordinarily stored by the media program provider 100, the nature of the MPSAS 200 (using cloud based storage and processing along with RESTful architecture principles) allows the MPSAS to be used by other independent media program providers 100 as well without significant modification. Such media program providers 100 may or may not use different pre-defined trend categories. Further, the MPSAS may be used by entities that generate the media programs themselves. In this embodiment, such entities use pre-defined trend categories specifically tailored to their media program(s), obtain trend information, compare that information with metadata about their programs, then provide supplementary content consistent that is likely of interest to those viewing those programs.

Hardware Environment

Figure 5:
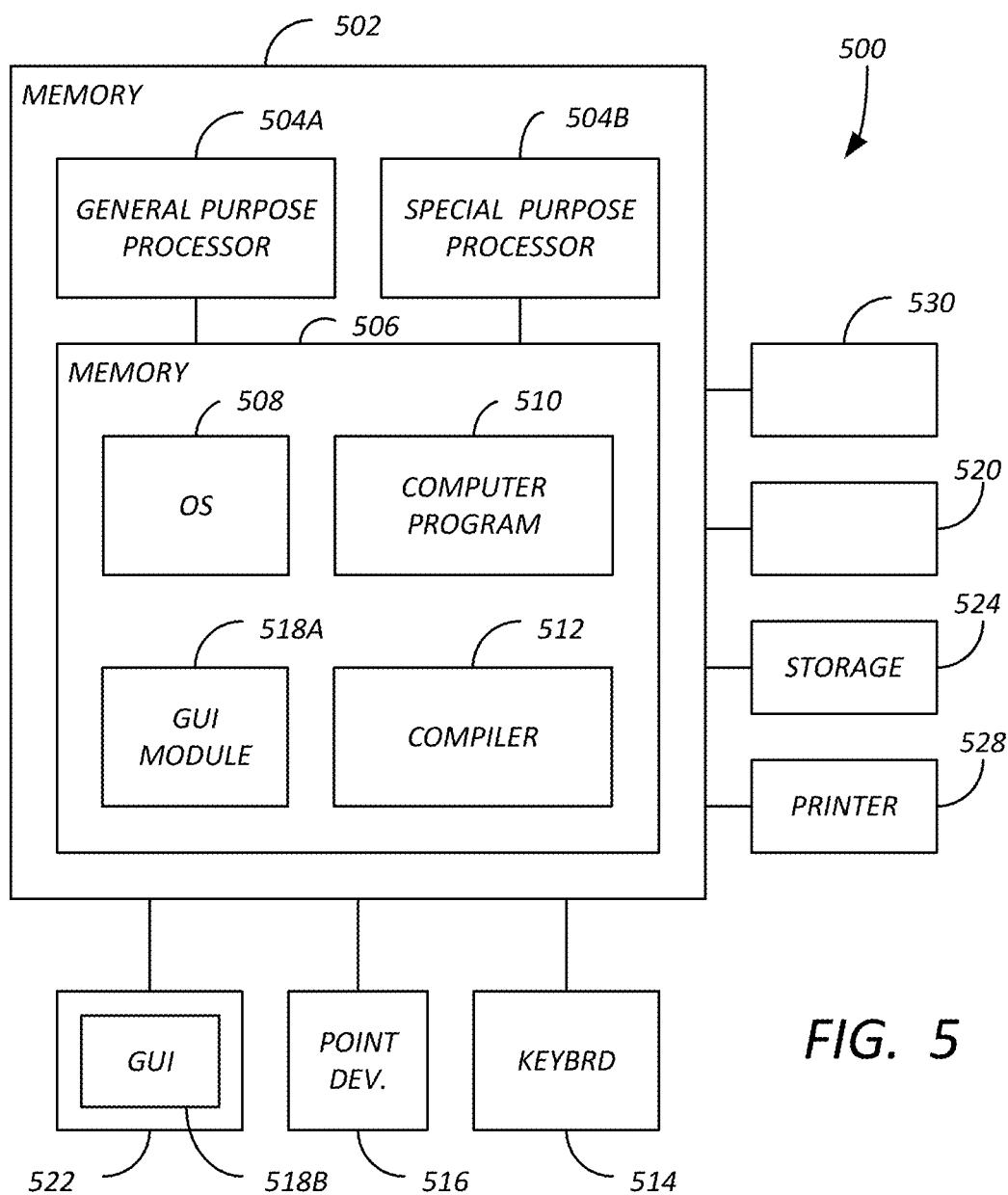
FIG. 5 is a diagram illustrating an exemplary computer system that could be used to implement elements of the present invention.

FIG. 5 is a diagram illustrating an exemplary computer system 500 that could be used to implement elements of the present invention, including elements of the MPSAS 200. The computer 502 comprises a general purpose hardware processor 504A and/or a special purpose hardware processor 504B (hereinafter alternatively collectively referred to as processor 504) and a memory 506, such as random access memory (RAM). The computer 502 may be coupled to other devices, including input/output (I/O) devices such as a keyboard 514, a mouse device 516 and a printer 528.

In one embodiment, the computer 502 operates by the general purpose processor 504A performing instructions defined by the computer program 510 under control of an operating system 508. The computer program 510 and/or the operating system 508 may be stored in the memory 506 and may interface with the user and/or other devices to accept input and commands and, based on such input and commands and the instructions defined by the computer program 510 and operating system 508 to provide output and results.

Output/results may be presented on the display 522 or provided to another device for presentation or further processing or action. In one embodiment, the display 522 comprises a liquid crystal display (LCD) having a plurality of separately addressable pixels formed by liquid crystals. Each pixel of the display 522 changes to an opaque or translucent state to form a part of the image on the display in response to the data or information generated by the processor 504 from the application of the instructions of the computer program 510 and/or operating system 508 to the input and commands. Other display 522 types also include picture elements that change state in order to create the image presented on the display 522. The image may be provided through a graphical user interface (GUI) module 518A. Although the GUI module 518A is depicted as a separate module, the instructions performing the GUI functions can be resident or distributed in the operating system 508, the computer program 510, or implemented with special purpose memory and processors.

Some or all of the operations performed by the computer 502 according to the computer program 510 instructions may be implemented in a special purpose processor 504B. In this embodiment, some or all of the computer program 510 instructions may be implemented via firmware instructions stored in a read only memory (ROM), a programmable read only memory (PROM) or flash memory within the special purpose processor 504B or in memory 506. The special purpose processor 504B may also be hardwired through circuit design to perform some or all of the operations to implement the present invention. Further, the special purpose processor 504B may be a hybrid processor, which includes dedicated circuitry for performing a subset of functions, and other circuits for performing more general functions such as responding to computer program instructions. In one embodiment, the special purpose processor is an application specific integrated circuit (ASIC).

The computer 502 may also implement a compiler 512 which allows an application program 510 written in a programming language such as COBOL, C++, FORTRAN, or other language to be translated into processor 504 readable code. After completion, the application or computer program 510 accesses and manipulates data accepted from I/O devices and stored in the memory 506 of the computer 502 using the relationships and logic that was generated using the compiler 512.

The computer 502 also optionally comprises an external communication device such as a modem, satellite link, Ethernet card, or other device for accepting input from and providing output to other computers.

In one embodiment, instructions implementing the operating system 508, the computer program 510, and/or the compiler 512 are tangibly embodied in a computer-readable medium, e.g., data storage device 520, which could include one or more fixed or removable data storage devices, such as a zip drive, floppy disc drive 524, hard drive, CD-ROM drive, tape drive, or a flash drive. Further, the operating system 508 and the computer program 510 are comprised of computer program instructions which, when accessed, read and executed by the computer 502, causes the computer 502 to perform the steps necessary to implement and/or use the present invention or to load the program of instructions into a memory, thus creating a special purpose data structure causing the computer to operate as a specially programmed computer executing the method steps described herein. Computer program 510 and/or operating instructions may also be tangibly embodied in memory 506 and/or data communications devices 530, thereby making a computer program product or article of manufacture according to the invention. As such, the terms "article of manufacture," "program storage device" and "computer program product" or "computer readable storage device" as used herein are intended to encompass a computer program accessible from any computer readable device or media.

Of course, those skilled in the art will recognize that any combination of the above components, or any number of different components, peripherals, and other devices, may be used with the computer 502.

Although the term "computer" is referred to herein, it is understood that the computer may include portable devices such as cellphones, portable MP3 players, video game consoles, notebook computers, pocket computers, or any other device with suitable processing, communication, and input/output capability.

CONCLUSION

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A system for managing a retrieval and provision of globally stored media programs, via a plurality of methods complying with a representational state transfer (REST) architectural constraint, the system comprising:
   storage assets, comprising:
      cold storage elements;
      hot storage elements; and
      wherein the media programs are retrievable by users requesting the media programs more rapidly from the hot storage elements than the cold storage elements;
   a demand trend analytics system, comprising:
      a social media module for collecting social networking data;
      a machine learning module processing the collected social networking data to identify a trending topic related to a topic category related to the globally stored media programs, and providing the processed collected social networking data via first method complying with the representational state transfer (REST) architectural constraint;
   a media metadata system, comprising:
      a scraper for scraping the globally stored media programs to generate metadata of the globally stored media programs, and for providing the metadata of the globally stored media programs via a second method complying with the REST architectural constraint;
   an indexing service, communicatively coupled to the demand trend analytics system and the media metadata system, the indexing service for accessing the processed collected social networking data and the metadata of the globally stored media programs via the first method and the second method, for generating an indexed database integrating the accessed processed collected social networking data and the metadata of the globally stored media programs, and for providing the indexed database via a third method complying with the REST architectural constraint;
   a media portal, communicatively coupled to the indexing service, the media metadata system and the demand trend analytics system, for accessing the indexed database via the third method and searching the indexed database to identify globally stored media programs correlating to the identified trending topics and for controlling processing of the identified globally stored media programs for storage by at least one of the hot storage elements according to the identified trending topics via a fourth method complying with the REST architectural constraint;
   wherein:
      the demand trend analytics system relates at least one of the trending topics to a geographical area; and the media portal controls the processing of the identified globally stored media programs for storage by the at least one of the hot storage elements proximate the geographical area.

2. The system of claim 1, further comprising:
an application interface (API) service bus, communicatively coupled to the demand trend analytics system, the media metadata system, the indexing service, and the media portal, the API service bus for inter-translating between the first method, the second method, the third method and the fourth method.

3. The system of claim 1, wherein:
the demand trend analytics system relates at least one of the trending topics to a media program format; and
the media portal further controls transcoding the identified globally stored media program to the media program format before provision to the at least one of the hot storage elements.

4. The system of claim 1, wherein:
the media metadata system further comprises:
a content management system for determining a physical storage location of locally stored media programs, and providing the physical storage location of the locally stored media programs to the indexing service via a fifth method complying with the REST architectural constraint.

5. The system of claim 4, wherein:
the media portal further controls the processing of the identified globally stored media programs for storage by the at least one of the hot storage elements according to the physical storage location of the locally stored media programs.

6. The system of claim 1, wherein the social networking data is collected through further of the plurality of methods complying with REST architectural constraint.

7. The system of claim 1, wherein:
the globally stored media programs are streamed by a media provider, and system further comprises an interface for collecting streaming metadata describing the streaming of the globally stored media programs and web click-throughs of webpages related to the globally stored media programs;
the demand trend analytics system further filters the streaming metadata and the web click-throughs; and
the trending topic related to the topic category related to the globally stored media programs is further identified from the processed streaming media and web click-throughs.

8. The system of claim 1, wherein processing the collected social networking data to identify the trending topic comprises comparing text and metadata of the collected social networking data with a plurality of keywords identified by a keyword association library.

9. The system of claim 1, wherein the processing the identified globally stored media programs for storage by at least one of the hot storage elements comprises:
identifying a required coding format for transmission of the identified globally stored media objects; and
transcoding the identified globally stored media programs from a native coding format to format required for transmission to a consumer of the identified globally stored media programs.

10. A method for managing a retrieval and provision of globally stored media programs, via a plurality of methods complying with a representational state transfer (REST) architectural constraint, the method comprising:

collecting social networking data with a demand trend analytics system;
processing the collected social networking data to identify a trending topic related to a topic category related to the globally stored media programs;
providing the processed collected social networking data via a first method complying with the REST architectural constraint;
scraping the globally stored media programs to generate metadata of the globally stored media programs; and
providing the metadata of the globally stored media programs via a second method complying with the REST architectural constraint;
accessing the processed collected social networking data and the metadata of the globally stored media programs via the first method and the second method;
generating an indexed database integrating the accessed processed collected social networking data and the metadata of the globally stored media programs;
providing the indexed database via a third method complying with the REST architectural constraint;
accessing the indexed database via the third method and searching the indexed database to identify globally stored media programs correlating to the identified trending topics; and
relating at least one of the trending topics to a geographical area; and
processing the identified globally stored media programs for storage by at least one of a plurality of hot storage elements proximate the geographical area via a fourth method complying with the REST architectural constraint.

11. The method of claim 10, further comprising:
inter-translating between the first method, the second method, the third method and the fourth method via an application interface (API) service bus.

12. The method of claim 10, wherein:
collected social networking data, processing the collected social networking data to identify a trending topic related to a topic category related to the globally stored media programs, relating the at least one of the trending topics to a geographical area, and providing the processed collected social networking data via a first method complying with the REST architectural constraint is performed by a demand trend analytics system;
scraping the globally stored media programs to generate metadata of the globally stored media programs and providing the metadata of the globally stored media programs via the second method complying with the REST architectural constraint is performed by a media metadata system;
accessing the processed collected social networking data and the metadata of the globally stored media programs via the first method and the second method, generating an indexed database integrating the accessed processed collected social networking data and the metadata of the globally stored media programs, and providing the indexed database via a third method complying with the REST architectural constraint is performed by an indexing service; and
accessing the indexed database via the third method and searching the indexed database to identify globally stored media programs correlating to the identified trending topics, and providing the identified globally stored media programs for storage by at least one of the hot storage elements via a fourth method complying with the REST architectural constraint is performed by a media portal.

13. The method of claim 12, wherein:
the demand trend analytics system further relates at least one of the trending topics to a media object format; and
the identified globally stored media programs are transcoded to the media object format before provision to the at least one of the hot storage elements.

14. The method of claim 10, further comprising:
further determining a physical storage location of locally stored media programs; and
providing the physical storage location of the locally stored media programs to an indexing service via a fifth method complying with the REST architectural constraint.

15. The method of claim 14, further comprising:
providing the identified globally stored media programs for storage by the at least one of the hot storage elements according to the physical storage location of the locally stored media programs.

16. The method of claim 10, wherein the social networking data is collected through further of the plurality of methods complying with REST architectural constraint.

17. The method of claim 10, wherein:
the globally stored media programs are streamed by a media provider, and system further comprises an interface for collecting streaming metadata describing the streaming of the globally stored media programs and web click-throughs of webpages related to the globally stored media programs;
the demand trend analytics system further filters the streaming metadata and the web click-throughs; and
the trending topic related to the topic category related to the globally stored media programs is further identified from the processed streaming media and web click-throughs.

18. The method of claim 10, wherein processing the collected social networking data to identify the trending topic comprises comparing text and metadata of the collected social networking data with a plurality of keywords identified by a keyword association library.

19. The method of claim 10, wherein the processing the identified globally stored media programs for storage by the at least one of the hot storage elements comprises:

transcoding the identified globally stored media programs from a native coding format to format required for transmission to a consumer of the identified globally stored media programs.

20. An apparatus for managing a retrieval and provision of globally stored media programs, via a plurality of methods complying with a representational state transfer (REST) architectural constraint, the apparatus comprising:
means for collecting social networking data with a demand trend analytics system;
means for processing the collected social networking data to identify a trending topic related to a topic category related to the globally stored media programs;
means for providing the processed collected social networking data via a first method complying with the REST architectural constraint;
means for scraping the globally stored media programs to generate metadata of the globally stored media programs;
means for providing the metadata of the globally stored media programs via a second method complying with the REST architectural constraint;
means for accessing the processed collected social networking data and the metadata of the globally stored media programs via the first method and the second method;
means for generating an indexed database integrating the accessed processed collected social networking data and the metadata of the globally stored media programs;
providing the indexed database via a third method complying with the REST architectural constraint;
means for accessing the indexed database via the third method and searching the indexed database to identify globally stored media programs correlating to the identified trending topics;
means for relating at least one of the trending topics to a geographical area;
means for processing the identified globally stored media programs for storage by at least one of a plurality of the hot storage elements proximate the geographical area via a fourth method complying with the REST architectural constraint and
means for inter-translating between the first method, the second method, the third method and the fourth method via an application interface (API) service bus.

* * * * *